(12) United States Patent
Winterot et al.

(10) Patent No.: US 6,693,742 B1
(45) Date of Patent: Feb. 17, 2004

(54) ARRANGEMENT FOR ILLUMINATION WITH A PLURALITY OF WAVELENGTHS IN A MICROSCOPE

(75) Inventors: Johannes Winterot, Jena (DE); Volker Juengel, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 146 days.

(21) Appl. No.: 09/696,553

(22) Filed: Oct. 25, 2000

(30) Foreign Application Priority Data

Oct. 26, 1999 (DE) .......................................... 199 51 482

(51) Int. Cl.7 .......................... G02B 21/06; G02B 21/00
(52) U.S. Cl. ........................ 359/381; 359/368; 359/385; 359/637
(58) Field of Search ................................ 359/368–390, 359/637; 351/200–246

(56) References Cited

U.S. PATENT DOCUMENTS

| | | | | |
|---|---|---|---|---|
| 5,161,052 A | * | 11/1992 | Hill | |
| 5,260,965 A | * | 11/1993 | Nakazeki et al. | 372/108 |
| 6,038,066 A | * | 3/2000 | Baumann | |
| 6,052,223 A | * | 4/2000 | Yoneyama et al. | |
| 6,084,698 A | * | 7/2000 | Bleicher et al. | |
| 6,188,514 B1 | * | 2/2001 | Saito et al. | |

FOREIGN PATENT DOCUMENTS

| | | |
|---|---|---|
| DE | 692 29 777 | 4/1991 |
| DE | 41 25 506 | 3/1993 |
| DE | 197 02 753 | 7/1998 |

* cited by examiner

*Primary Examiner*—Thong Nguyen
(74) *Attorney, Agent, or Firm*—Reed Smith LLP

(57) ABSTRACT

An arrangement is disclosed for illumination with a plurality of wavelengths in a microscope. The arrangement comprises correction optics which are provided in a parallel beam path within illumination/imaging optics for generating an exact overlapping of the wavelengths in the specimen volume in an adjustable manner. The correction optics generate an adjustable directional change for at least one wavelength to compensate transverse chromatic aberrations for the wavelength.

17 Claims, 3 Drawing Sheets

ARRANGEMENT FOR ILLUMINATION WITH A PLURALITY OF WAVELENGTHS IN A MICROSCOPE

CROSS-REFERENCE TO RELATED APPLICATIONS

This application claims priority of German Application No. 199 51 482.8, filed Oct. 26, 1999, the complete disclosure of which is hereby incorporated by reference.

BACKGROUND OF THE INVENTION a) Field of the Invention

The invention relates to the illumination of a specimen with laser light of different wavelengths, preferably in cross correlation variants of fluorescence correlation spectroscopy (FCS). However, it is also advantageously applicable in other microscope systems such as the laser scanning microscope and in the detection of time-resolved fluorescence in order to guide the illumination of a plurality of wavelengths simultaneously or sequentially to exactly the same location on the specimen.

b) Description of the Related Art

In cross correlation FCS, simultaneous spectrally separated detection of two differently marked reacting agents and their two-color reaction product is carried out. The mathematical comparison of the detector signals supplies information about the concentration and dynamics of the associated co-reactants without disruptive contributions from the individual components.

It is necessary to illuminate a small specimen volume which has a diameter in the range of the Airy disk with two lasers of different wavelength. The two volumes must overlap very well with one another.

Due to unavoidable manufacturing and alignment tolerances, a transverse chromatic aberration and therefore an insufficient overlapping of the volumes cannot be ruled out with illumination by different wavelengths.

OBJECT AND SUMMARY OF THE INVENTION

It is the primary object of the invention to ensure the most exact possible overlapping of the volumes in the illumination with different wavelengths.

According to the invention, this object is met in an arrangement for illumination with a plurality of wavelengths in a microscope wherein correction optics are provided in a parallel beam path within the illumination/imaging optics for generating an exact overlapping of the wavelengths in the specimen volume in an adjustable manner.

The invention and its effects and advantages will be explained more fully in the following with reference to the schematic drawings.

DESCRIPTION OF THE PREFERRED EMBODIMENTS

FIG. 1:

Light with a plurality of wavelengths is coupled into the illumination beam path. This is carried out via input coupling optics EO which generate beam bundles corrected to infinity. The correction optics KO according to the invention which are movable in the beam path for purposes of adjustment are arranged following the input coupling optics. The illumination of the specimen volume P is carried out via a main color splitter, transfer or relay optics ÜO which generate an intermediate image and which can also be the scanning objective of a laser scanning microscope—according to DE 19702793, for example—following a scanner, a tube lens TL and an objective Obj. The detection of the measurement signal is carried out in a detection unit DE which is located behind the main color splitter, and focusing detection optics. The detection unit contains wavelength-dispersive elements, e.g., dichroic beam splitters and corresponding filters and detectors.

The beam path is parallel between the input coupling optics EO and the relay optics ÜO and between the tube lens TL and the objective Obj. According to the invention, a correction of occurring transverse chromatic aberrations is carried out via correction optics KO in one of the two parallel beam paths.

The correction optics comprise an afocally active combination of glasses with the same index of refraction, but with different dispersion. Due to the dispersion shift at an inner boundary or interface GF of the correction optics, a beam bundle passing through is deflected with respect to the optical axis in different ways depending on its wavelength.

In order to achieve the desired correction effect, different technical realizations are possible.

A first advantageous solution is based on the use of the refractive index shift at a curved interface between a planoconvex lens and a planoconcave lens with extra-axial passage of the parallel illumination light through a correction element of the type mentioned above. Different wavelengths are affected differently with respect to their direction (transverse chromatic aberration) and their convergence/divergence (longitudinal chromatic aberration).

Figure 1:
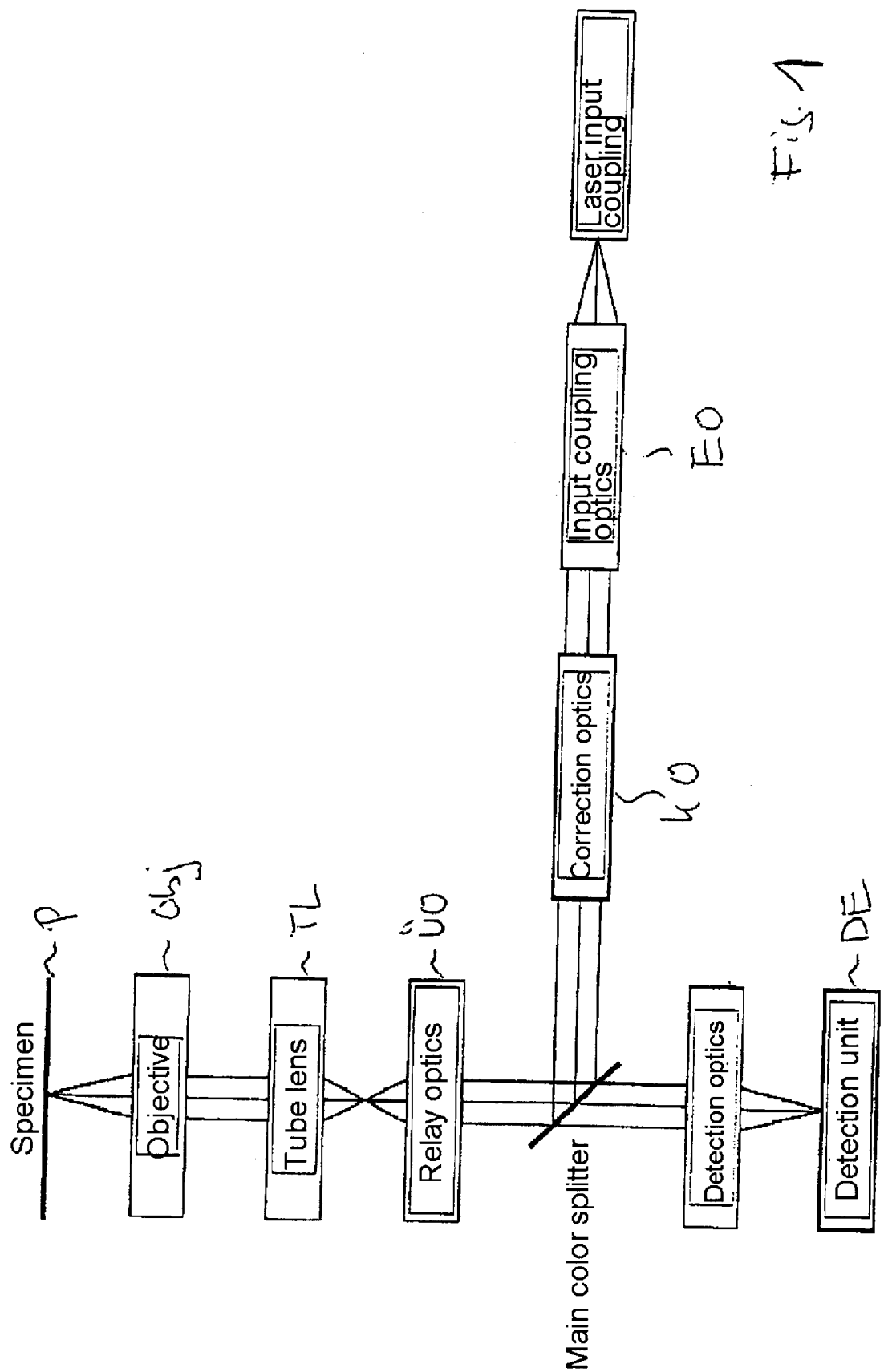
FIG. 1 shows, by way of example, an arrangement for cross correlation FCS or other microscope detection methods with correction optics according to the invention.
Figure 2:
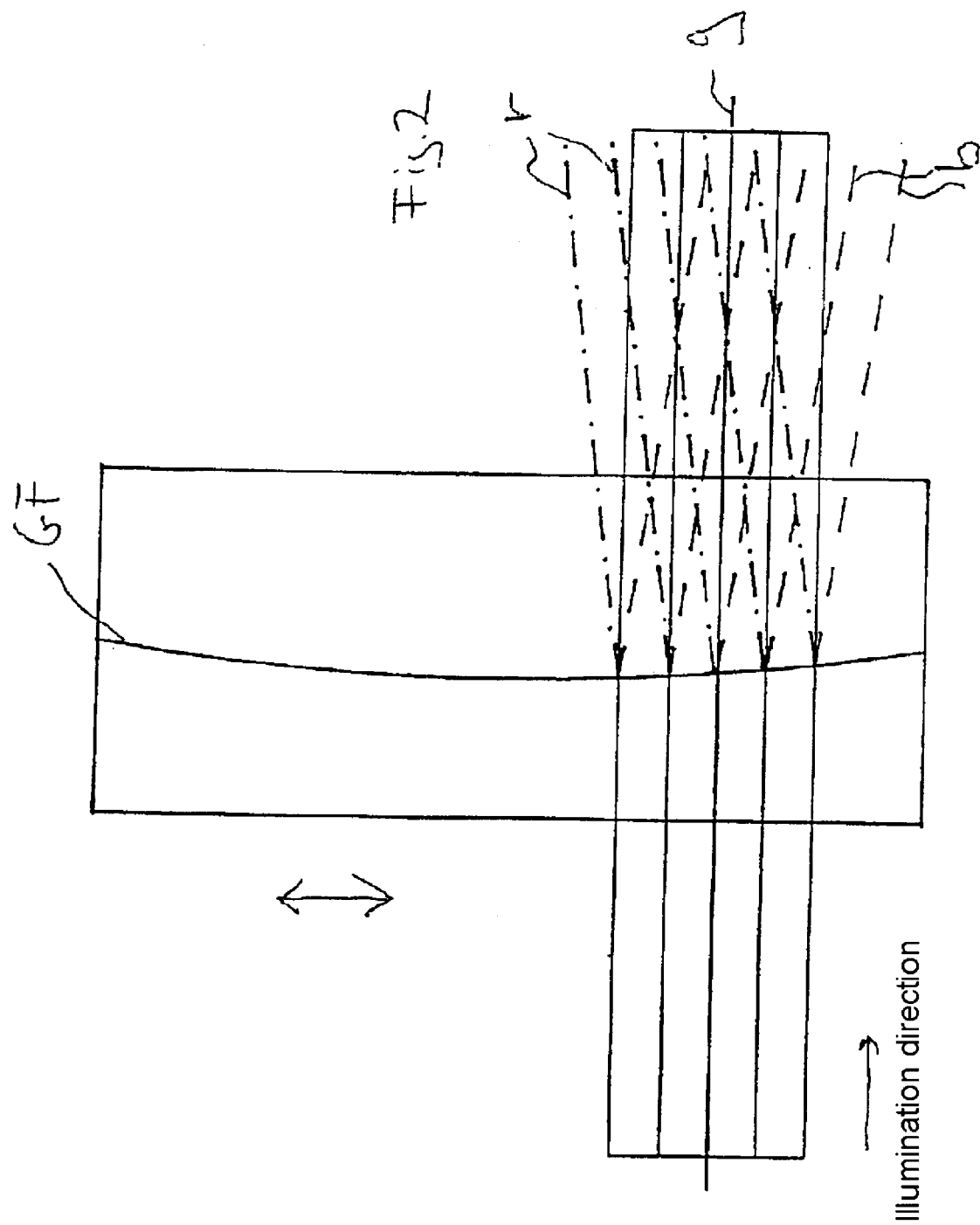
FIG. 2 shows a schematic beam shape at the correction optics used in the parallel beam path according to embodiment 1.

One possible realization is shown according to embodiment 1 in Table 1 and is illustrated in FIG. 2. Other realizations are characterized by glass combinations corresponding to embodiments 2, 3 and 4 in Table 1.

Embodiments 1 and 2 are oppositely constructed, i.e., in one case, the crown glass lens collects and the flint glass lens scatters, and vice versa. The solutions are equivalent and differ only in the required movement direction of the displacement for compensating the transverse chromatic aberration. The effects on the longitudinal chromatic aberration are opposite.

In embodiments 3 and 4, the influence of the longitudinal chromatic aberration is compensated for the tilted wavelengths by an opposing afocal achromat. For this purpose, embodiments 1 and 2 or 2 and 1 are combined with one another. First, the two correction elements according to embodiments 1 and 2 are inserted in the center of the beam path and one of the two is displaced extra-axially. Embodiments 3 and 4 are free of secondary effects with respect to the longitudinal chromatic aberration. When the longitudinal chromatic aberration is taken into account in the design of the overall beam path, embodiments 1 and 2 are advantageously used.

TABLE 1

Embodiment 1

| Radii | Plane | 38.129 | Plane |
|---|---|---|---|
|  | \| | ( | \| |
| Thickness |  2 | 3 |  |
| Material | NSK16 | NF2 |  |
| Manufacturer | SCHOTT | SCHOTT |  |
| $n_e$ | 1.62286 | 1.62408 |  |
| $v_e$ | 60.08 | 36.11 |  | red scattering, blue collecting

Embodiment 2

| Radii | Plane | 38.129 | Plane |
|---|---|---|---|
|  | \| | ) | \| |
| Thickness | 2 | 3 |  |
| Material | NSK16 | NF2 |  |

TABLE 1-continued

| Manufacturer | SCHOTT | SCHOTT |
|---|---|---|
| $n_e$ | 1.62286 | 1.62408 |
| $v_e$ | 60.08 | 36.11 | blue scattering, red collecting

Embodiment 3

| Radii | Plane | 38.129 | Plane | Plane | 38.129 | Plane |
|---|---|---|---|---|---|---|
|  | \| | ( | \| | \| | ) | \| |
| Thickness | 2 | 3 |  | 3 | 2 |  |
| Material | NSK16 | NF2 |  | NSK16 | NF2 |  |
| Manufacturer | SCHOTT | SCHOTT |  | SCHOTT | SCHOTT |  |
| $n_e$ | 1.62286 | 1.62408 |  | 1.62286 | 1.62408 |  |
| $v_e$ | 60.08 | 36.11 |  | 60.08 | 36.11 |  |

Embodiment 4

| Radii | Plane | 38.129 | Plane | Plane | 38.129 | Plane |
|---|---|---|---|---|---|---|
|  | \| | ) | \| | \| | ( | \| |
| Thickness | 3 | 2 |  | 2 | 3 |  |
| Material | NSK16 | NF2 |  | NSK16 | NF2 |  |
| Manufacturer | SCHOTT | SCHOTT |  | SCHOTT | SCHOTT |  |

TABLE 1-continued

| $n_e$ | 1.62286 | 1.62408 |  | 1.62286 | 1.62408 |
|---|---|---|---|---|---|
| $v_e$ | 60.08 | 36.11 |  | 60.08 | 36.11 |

Figure 3:
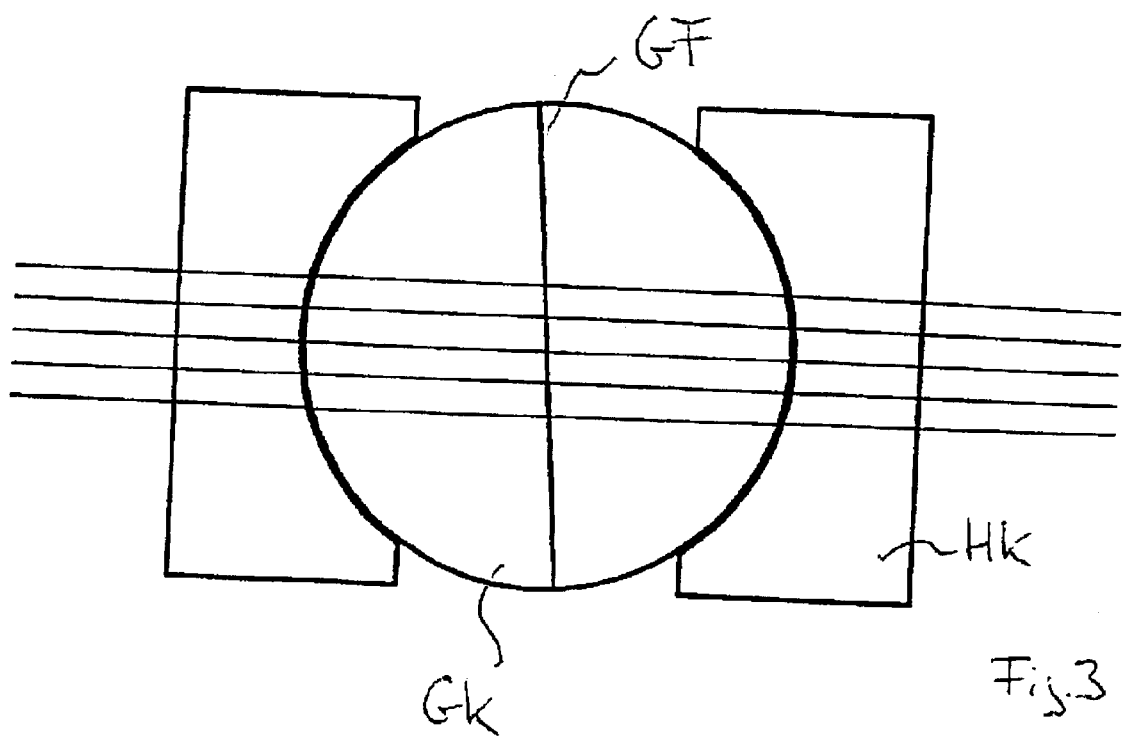
FIG. 3 shows a schematic beam shape at the correction optics used in the parallel beam path according to embodiment 5.

Another advantageous solution is based on a refractive index shift at a plane interface with changeable angle of inclination of this interface and the wavelength-dependent influencing of the beam direction. A solution with an adjustable changeable wedge angle is illustrated in FIG. 3 and the associated embodiment 5 is illustrated in Table 2.

A glass ball GK which is rotatable in semispherical holders HK is constructed from different materials (crown glass, flint glass). A different refraction which is wavelength-dependent is carried out at the interface GF depending on the angle of incidence.

The material of the holders HK corresponds to the material of the adjacent half of the ball, so that the beam is not affected by the holders HK. Embodiment 5 has no secondary effect on the longitudinal chromatic aberration and is therefore optically equivalent to embodiments 3 and 4. However, the required installation space is greater.

Arrangements comprising a plurality of glass wedges with changeable wedge angles for generating a divergence for determined wavelengths which can be arranged so as to be exchangeable or rotatable in the beam path are also possible.

| Radii | Plane | 6.1 | 6.0 | Plane | 6.0 | 6.1 | Plane |
|---|---|---|---|---|---|---|---|
|  | \| | ( | ( | \| | ) | ) | \| |
| Thickness | 3 | 0.1 | 6.0 | 6.0 | 0.1 | 3 | 3 |
| Material | NSK16 |  | NSK16 | NF2 |  | NF2 | ~~NF2~~ |
| Manufacturer | SCHOTT |  | SCHOTT | SCHOTT |  | SCHOTT | ~~SCHOTT~~ |
| $n_e$ | 1.62286 |  | 1.62286 | 1.62408 |  | 1.62408 | ~~1.62408~~ |
| $v_e$ | 60.08 |  | 60.08 | 36.11 |  | 36.11 | ~~36.11~~ |

By means of displacement of the correction optics vertical to the optical axis in embodiments 1 to 4 and FIG. 2 or by rotating the cemented ball in embodiment 5 and FIG. 3, the extent of deflection is adjusted and accordingly existing transverse chromatic aberrations are eliminated in the specimen. While the (middle) wavelength g in every position of the correction optics in the selected example passes through in a straight line, the wavelengths r and b are deflected differently.

The adjustment of the correction optics can advisably be carried out by direct observation of the illumination volumes or also indirectly by evaluating the analysis signals, e.g., cross correlation signal.

While the foregoing description and drawings represent the present invention, it will be obvious to those skilled in the art that various changes may be made therein without departing from the true spirit and scope of the present invention.

What is claimed is:

1. An arrangement for illumination with a plurality of wavelengths in a microscope, comprising:
   correction optics being provided in a parallel and non-imaging illumination beam path within illumination optics for generating an exact overlapping of the wavelengths in a specimen volume in an adjustable manner;
   said correction optics being non-interchangeably movable to generate an adjustable directional change for at least one wavelength to compensate for transverse chromatic aberrations for the wavelength.

2. The arrangement according to claim 1, wherein the directional change is generated at a curved interface between two glass bodies of different material.

3. The arrangement according to claim 1, wherein the correction optics are located in a parallel illumination beam bundle which is mixed in via a beam splitter in the direction of at least one illumination/imaging objective.

4. The arrangement according to claim 3, wherein the parallel bundle passes through the correction optics extra-axially and the correction optics are constructed so as to be displaceable vertical to an optical axis.

5. The arrangement according to claim 1, wherein the correction optics comprise at least one afocal achromat.

6. The arrangement according to claim 5, wherein the correction optics include two afocal achromats with opposite effect with respect to a longitudinal chromatic aberration which are combined with one another.

7. The arrangement according to claim 1, wherein the directional change is generated at a plane interface between two glass bodies of different material.

8. The arrangement according to claim 7, wherein the glass bodies are connected glass balls of different material.

9. The arrangement according to claim 8, wherein the angle of the interface to an illumination axis is changeable in an adjustable manner.

10. The arrangement according to claim 1, wherein the correction optics comprise at least one glass wedge for generating a beam divergence for at least one wavelength.

11. The arrangement according to claim 1, wherein the arrangement is used with laser light to study the specimen using two-fluorescence cross correlation spectroscopy.

12. The arrangement according to claim 1, wherein the arrangement is used with laser light to study the specimen using laser scanning microscopy.

13. An arrangement for illumination with a plurality of wavelengths in a laser scanning microscope, comprising:

input coupling optics that couples light beams of a plurality of wavelengths into an illumination beam path, the plurality of light beams at the output of the input coupling optics being parallel to each other;

correction optics coupled to receive the parallel light beams from the input coupling optics and compensate for a transverse chromatic aberration of at least one wavelength to generate an overlapping of the wavelengths in a specimen under study, the correction optics being non-interchangeably movable to vary the compensation amount of the transverse chromatic aberration.

14. The arrangement according to claim 13 wherein the correction optics comprises first and second glass bodies with each having a plane surface, the plane surfaces of the glass bodies being attached to each other and defining a plane interface where the directional change of the at least one wavelength occurs.

15. The arrangement according to claim 13 wherein:

the correction optics comprises first and second glass bodies with each having a plane surface, the plane surfaces of the glass bodies being attached to each other and defining a plane interface where the directional change of the at least one wavelength occurs; and the glass bodies are rotatable to adjust the compensation amount of the transverse chromatic aberration.

16. An arrangement for illumination with a plurality of wavelengths in a microscope, comprising:

correction optics being provided in a parallel beam path within illumination/imaging optics for generating an exact overlapping of the wavelengths in a specimen volume in an adjustable manner;

said correction optics generating an adjustable directional change for at least one wavelength to compensate transverse chromatic aberrations for the wavelength;

wherein:

the directional change is generated at a plane interface between two glass bodies of different material;

the glass bodies are connected glass balls of different material; and the angle of the interface to an illumination axis is changeable in an adjustable manner.

17. An arrangement for illumination with a plurality of wavelengths in a laser scanning microscope, comprising:

input coupling optics that couples light beams of a plurality of wavelengths into an illumination beam path, the plurality of light beams at the output of the input coupling optics being parallel to each other;

correction optics coupled to receive the parallel light beams from the input coupling optics and compensate for a transverse chromatic aberration of at least one wavelength to generate an overlapping of the wavelengths in a specimen under study, the correction optics being non-interchangeably movable to vary the compensation amount of the transverse chromatic aberration;

wherein:

the correction optics comprises first and second glass bodies with each having a plane surface, the plane surfaces of the glass bodies being attached to each other and defining a plane interface where the directional change of the at least one wavelength occurs; and the glass bodies are rotatable to adjust the compensation amount of the transverse chromatic aberration.

* * * * *